United States Patent
Battle et al.

(10) Patent No.: US 11,157,276 B2
(45) Date of Patent: Oct. 26, 2021

(54) THREAD-BASED ORGANIZATION OF SLICE TARGET REGISTER FILE ENTRY IN A MICROPROCESSOR TO PERMIT WRITING SCALAR OR VECTOR DATA TO PORTIONS OF A SINGLE REGISTER FILE ENTRY

(71) Applicant: International Business Machines Corporation, Armonk, NY (US)

(72) Inventors: Steven J. Battle, Austin, TX (US); Maarten J. Boersma, Holzgerlingen (DE); Niels Fricke, Herrenberg (DE); Hung Q. Le, Austin, TX (US); Dung Q. Nguyen, Austin, TX (US); Brian W. Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 16/563,091

(22) Filed: Sep. 6, 2019

(65) Prior Publication Data
US 2021/0072993 A1    Mar. 11, 2021

(51) Int. Cl.
*G06F 9/30* (2018.01)

(52) U.S. Cl.
CPC ...... *G06F 9/30112* (2013.01); *G06F 9/30109* (2013.01); *G06F 9/30123* (2013.01); *G06F 9/3013* (2013.01); *G06F 9/30141* (2013.01)

(58) Field of Classification Search
CPC .. G06F 9/30112; G06F 9/384; G06F 9/30123; G06F 9/3013; G06F 9/3851; G06F 9/5061; G06F 9/30109
See application file for complete search history.

(56) References Cited

U.S. PATENT DOCUMENTS

| 4,594,660 A    | 6/1986 | Guenthner et al. |
| 6,237,076 B1 * | 5/2001 | Gaertner ............. G06F 9/30014 711/202 |
| 6,366,998 B1   | 4/2002 | Mohamed |
| 6,711,602 B1   | 3/2004 | Bhandal et al. |

(Continued)

OTHER PUBLICATIONS

IBM, "POWER8 Processor User's Manual for the Single-Chip Module", Mar. 16, International Business Machines Corporation, pp. 31-35, 135, 149, 266-268 and 449-450 (Year: 2016).*

(Continued)

*Primary Examiner* — William B Partridge
*Assistant Examiner* — Courtney P Carmichael-Moody
(74) *Attorney, Agent, or Firm* — Scully, Scott, Murphy & Presser, P.C.

(57) ABSTRACT

A computer system, processor, and method for processing information is disclosed. The system, processor and/or method includes at least one computer processor; a register file associated with the at least one processor, the register file having a plurality of entries for storing data where a whole entry has two halves, the register file having multiple ports to write data to the register file and multiple ports to read data from the register file; and one or more execution units associated with the register file, the execution units configured to read data from the register file and to write data to the register file, wherein the processor is configured to write either scalar data or vector data to a single register file entry.

19 Claims, 8 Drawing Sheets

510

| No. | Left (0:63) | Right (0:63) |        |
|-----|-------------|--------------|--------|
| 0   | GPR0        | GPR1         | 511 (1) |
| 1   | FPR0        | GPR1         | 511 (2) |
| 2   | FPR0        | FPR1         |        |
| 3   | GPR0        | FPR1         |        |
| 4   | Vector data | Vector data  | 511 (n) |
|  |  |  |  |

(56) References Cited

U.S. PATENT DOCUMENTS

| | | | |
|---|---|---|---|
| 6,874,079 | B2 | 3/2005 | Hogenauer |
| 7,334,201 | B1 | 2/2008 | Sanghavi et al. |
| 8,046,566 | B2 | 10/2011 | Abernathy et al. |
| 8,069,290 | B2 | 11/2011 | Conti et al. |
| 8,261,046 | B2 | 9/2012 | Gibert et al. |
| 8,412,761 | B2* | 4/2013 | Yoshida .............. G06F 9/30185 708/513 |
| 9,207,995 | B2 | 12/2015 | Boersma et al. |
| 9,323,528 | B2 | 4/2016 | Sasanka |
| 9,690,586 | B2 | 6/2017 | Eisen et al. |
| 9,720,696 | B2 | 8/2017 | Chu et al. |
| 9,804,851 | B2* | 10/2017 | Grisenthwaite ....... G06F 9/3016 |
| 9,870,045 | B2 | 1/2018 | Battle et al. |
| 10,282,206 | B1 | 5/2019 | Sun et al. |
| 2007/0239970 | A1* | 10/2007 | Liao ..................... G06F 9/3012 712/225 |
| 2008/0313424 | A1* | 12/2008 | Gschwind ............ G06F 9/3885 712/23 |
| 2009/0198966 | A1* | 8/2009 | Gschwind ........... G06F 9/30109 712/208 |
| 2013/0246761 | A1* | 9/2013 | Derby ................. G06F 9/30098 712/225 |
| 2015/0006855 | A1* | 1/2015 | Gschwind ............ G06F 9/3806 712/207 |
| 2015/0121047 | A1* | 4/2015 | Bradbury ............ G06F 9/30112 712/226 |
| 2016/0070574 | A1* | 3/2016 | Boersma ............... G06F 9/3012 712/214 |
| 2016/0092231 | A1 | 3/2016 | Chu et al. |
| 2016/0357566 | A1 | 12/2016 | Bowman et al. |
| 2017/0109093 | A1 | 4/2017 | Chu et al. |
| 2017/0109171 | A1 | 4/2017 | Eisen et al. |
| 2018/0225124 | A1 | 8/2018 | Gupta et al. |

OTHER PUBLICATIONS

IBM, "IBM POWER8 processor core microarchitecture", February, International Business Machines Corporation, p. 2:1 to 2:21 (Year: 2015).*

Anonymously; "Method to reduce the area and increase the speed of a highly ported register file" Nov. 13, 2002, htpp://ip.com/IPCOM/000010255D, pp. 1-8.

IBM; "A method of register renaming for a merged register file sharing different data types", Feb. 4, 2008, htpp://ip.com/IPCOM/000167251D, pp. 1-4.

Anonymously, "Control for activation of reduced leakage mode in write circuitry of SRAM arrays and register files", Apr. 25, 2012, htpp://ip.com/IPCOM/00216955D, pp. 1-4.

Zilles, C et al., "Execution-based Prediction Using Speculative Slices", 28th Annual International Symposium on Computer Architectures (ISCA2001) Jul. 2001, pp. 1-12.

Collins, JD et al., "Dynamic Speculative Precomputation", In Proceedings of the 34th International Symposium on Mircroarchitecture, Dec. 2001, pp. 1-12.

Anne Bracy, Prashant Prahlad, and Amir Roth, "Dataflow minigraphs: Amplifying superscalar capacity and bandwidth," In Microarchitecture, 2004. MICRO-37 2004. 37th International Symposium on, pp. 18-29. IEEE, 2004.

Stephan Wong, Fakhar Anjam, Faisal Nadeem, "Dynamically reconfigurable register file for a softcore VLIW processor," Date '10 2010, Proceedings of the Conference on Design, Automation and Test in Europe, pp. 969-972.

John Kloosterman, Jonathan Beaumont, D. Anoushe Jamshidi, Jonathan Bailey, Trevor Mudge, and Scott Mahlke, "Regless: just-in-time operand staging for GPUs," Oct. 2017 MICRO-50 '17: Proceedings of the 50th Annual IEEE/ACM International Symposium on Microarchitecture, pp. 151-164.

Athanasaki, E. et al., "Exploring the Performance Limits of Simultaneous Multithreading for Memory Intensive Applications", Springer Science+Business Media, LLC, 2007, pp. 1-34.

IBM, "Method of Saving Power in a Register File Supporting Multiple SMT Modes Using a Free List Stack to Manage Allocation/Deallocation of the Register File Pointers", Feb. 5, 2008, htpp://ip.com/IPCOM000167259D, pp. 1-4.

Anonymously, "System and Method for Achieving Out-of-Order Execution of Instructions in Simultaneous Multithreaded (SMT) Processor Cores", Sep. 20, 2010, htpp://ip.com/IPCOM000199883D, pp. 1-6.

Anonymously, "Method and System for Implementing "Register Threads" in a Simultaneously-Multithreaded (SMT) Processor Core", Sep. 17, 2010, htpp://ip.com/IPCOM000199825D, pp. 1-5.

List of IBM Patents or Patent Applications Treated as Related, Nov. 23, 2019, p. 2.

Office Action dated Dec. 21, 2020 received in U.S. Appl. No. 16/563,015, 20 pages.

Notice of Allowance dated Feb. 8, 2021 received in U.S. Appl. No. 16/562,934.

* cited by examiner

Fig. 5A

| No. | Left (0:63) | Right (0:63) |
|-----|-------------|--------------|
| 0 | GPR0 | — |
| 1 | FPR0 | — |
| 2 | FPR0 | — |
| 3 | GPR0 | — |
| 4 | Vector data | Vector data |
| • | | |

| No. | Left (0:63) | Right (0:63) |
|-----|-------------|--------------|
| 0 | GPR0 | GPR1 |
| 1 | FPR0 | GPR1 |
| 2 | FPR0 | FPR1 |
| 3 | GPR0 | FPR1 |
| 4 | Vector data | Vector data |
| • | | |

511(1), 511(2), 511(n), 510

610

BANK 0 (B0)

| No. | Left | Right |
|-----|------|-------|
| 0 | | |
| 1 | | |
| • | | |
| 89 | | |

BANK 1 (B1)

| No. | Left | Right |
|-----|------|-------|
| 0 | | |
| 1 | | |
| • | | |
| 89 | | |

BANK 2 (B2)

| No. | Left | Right |
|-----|------|-------|
| 0 | | |
| 1 | | |
| • | | |
| 89 | | |

BANK 3 (B3)

| No. | Left | Right |
|-----|------|-------|
| 0 | | |
| 1 | | |
| • | | |
| 89 | | |

Fig. 6

THREAD-BASED ORGANIZATION OF SLICE TARGET REGISTER FILE ENTRY IN A MICROPROCESSOR TO PERMIT WRITING SCALAR OR VECTOR DATA TO PORTIONS OF A SINGLE REGISTER FILE ENTRY

BACKGROUND OF INVENTION

The present invention generally relates to data processing systems, processors, and more specifically to register files in processors, including out-of-order execution processors.

Processors currently used in data processing systems process more than one instruction at a time, and often process those instructions out-of-order. In modern computer architecture, there are several known ways to design a computer adapted to perform more than one instruction at a time, or at least in the same time frame. For example, such a computer may include more than one processor core (i.e., central processing unit) and each processor core may be capable of acting independently of other processor cores. This may allow for true multitasking, with each processor core processing a different instruction stream in parallel with the other processor cores of the computer.

Another design to improve throughput includes multiple execution slices within a processor core to process multiple instruction threads at the same time, with the threads sharing certain resources of the processor core. An execution slice may refer to multiple data processing hardware units connected in series within a processor core as a pipeline or pipeline-like structure where several pipelines operate in parallel to process multiple instructions in a single processing cycle. Pipelining involves processing instructions in stages, so that the pipelined stages may process a number of instructions concurrently. Multiple execution slices may be used as part of simultaneous multi-threading (SMT) within a processor core.

The various pipelined stages may include an "instruction fetch" stage where an instruction is fetched from memory. In a "decode" stage, the instruction is decoded into different control bits, which in general designate (i) a type of functional unit (e.g., execution unit) for performing the operation specified by the instruction, (ii) source operands for the operation, and (iii) destinations for results of the operation. In a "dispatch" stage, the decoded instruction is dispatched to an issue queue (ISQ) where instructions wait for data and an available execution unit. Next, an instruction in the issue queue is issued to an execution unit in an "execution" stage. The "execution" stage processes the operation as specified by the instruction. Executing an operation specified by an instruction typically includes accepting data, e.g., one or more operands, and producing one or more results. There are usually register files associated with the execution units and/or the issue queue to hold data and/or information for the execution units. Register files typically have information read from and/or written to entries or locations in the register file.

SUMMARY

The summary of the disclosure is given to aid understanding of a computer system, computer architectural structure, processor, register files, and method of using register files in a processor, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, register files, and/or their method of operation to achieve different effects.

In an embodiment, a system for processing information is disclosed. The system has at least one computer processor; a register file associated with the at least one processor, the register file having a plurality of entries for storing data where a whole entry has two halves, the register file having multiple ports to write data to the register file and multiple ports to read data from the register file; and one or more execution units associated with the register file, the execution units configured to read data from the register file and to write data to the register file. In one or more aspects, the processor is configured to write either scalar data or vector data to a single register file entry. In an aspect, the register file spans across a super slice of execution units. In a further aspect, an execution unit writes vector data to both halves of the whole register file entry in both single thread mode and double thread mode, and preferably, the processor, more specifically in an embodiment the execution unit, is further configured to write scalar data to half the register file entry. According to one or more aspects, the processor in single thread mode is configured to write scalar data into half the register file entry and to leave the other half of the register file empty, and in addition, or alternatively, in double thread mode the processor is configured to write a first thread of scalar data into a first half of the register file entry and write a second thread of scalar data into a second half of the register file entry.

The system according to one or more embodiments, further includes a mapper that tracks and manages the register file entries, the mapper having a free list that identifies which halves of a register file entry are free to receive data. The mapper in one embodiment performs two searches, a first search to identify register file entries that have a single half entry that is free and a second search to identify register that have both halves of a whole register file entry free. The register file in one or more embodiments is partitioned into a plurality of banks, and each execution unit writes to a specified bank. In an aspect, the mapper provides STF tags which identify the different register file entries where the STF tags comprise a bit field that include one or more bits for identifying the bank of the register file, and one or more bits for identifying the location of the register file entry in the bank. In addition, the STF bit field can include one more bits to select between the two halves of the register file entry. The half of the register file entry into which scalar data is written and read, in an embodiment, is dependent upon the thread of the instruction.

An embodiment of a computer system for processing information is also disclosed that includes at least one processor; a register file associated with the at least one processor, the register file having a plurality of entries for storing data, the register file having multiple ports to write data to the register file and multiple ports to read data from the register file; one or more execution units associated with the register file, the one or more execution units configured to write data to and read data from the register file; one or more computer readable non-transitory storage media; and programming instructions stored on the one or more computer readable non-transitory storage media for execution by the at least one processor. The programming instructions when executed by the processor cause the processor to read either scalar or vector data from a single entry in the register file; and to write either scalar or vector data to a single entry in the register file.

The register file in one or more embodiments is partitioned into a plurality of banks, and each execution unit writes to a specified bank. In an aspect, the mapper provides STF tags which identify the different register file entries where the STF tags comprise a bit field that include one or more bits for identifying the bank of the register file, and one or more bits for identifying the location of the register file entry in the bank. In an aspect, each bank of the register file can allocate up to X STF tags per cycle where each bank is searched for X left half register file entries that are free, X right half entries that are free, and X whole register file entries that are free, where X is an integer greater than one. Each half of a register file entry has a free bit to identify when a register file entry half is free and available to be allocated to receive data. Vector data (wide data bits), in an embodiment, is read from a whole register file according to the thread of its instruction, and scalar data (e.g., 64 or 72 bit data), in an embodiment, is read from half a register file according to the thread of its instruction.

One or more methods of processing data in a system having a processor are also disclosed. The method in an embodiment includes writing vector data to a single whole register file entry; and writing scalar data to half of a single register file entry. The method according to one or more embodiments further includes writing scalar data from two different threads of execution wherein the scalar data from a first thread of execution is written to a first half of a single register file entry, and the scalar data from a second thread of execution is written to a second half of the single register file entry.

The foregoing and other objects, features and advantages of the invention will be apparent from the following more particular descriptions of exemplary embodiments of the invention as illustrated in the accompanying drawings

BRIEF DESCRIPTION OF THE DRAWINGS

The various aspects, features, and embodiments of the computer system, computer architectural structure, processors, register files, and/or their method of operation will be better understood when read in conjunction with the figures provided. Embodiments are provided in the figures for the purpose of illustrating aspects, features, and/or various embodiments of the computer system, computer architectural structure, processors, register files, and their method of operation, but the claims should not be limited to the precise system, assembly, subassembly, arrangement, structures, features, aspects, embodiments, and/or devices shown, and the systems, assemblies, subassemblies, arrangements, structures, features, aspects, embodiments, methods, processes, and/or devices shown may be used singularly or in combination with other systems, assemblies, subassemblies, arrangements, structures, features, aspects, embodiments, methods and/or devices.

FIG. 5A illustrates an embodiment of a register file in a processor operating in single threaded mode according to an aspect of the present disclosure. FIG. 5B illustrates an embodiment of a register file in a processor operating in double-threaded mode according to an aspect of the present disclosure.

FIG. 6 illustrates a block diagram of a slice target register file (STF) according to an aspect of the present disclosure.

DETAILED DESCRIPTION

The following description is made for illustrating the general principles of the invention and is not meant to limit the inventive concepts claimed herein. In the following detailed description, numerous details are set forth in order to provide an understanding of the computer system, computer architectural structure, processor, register files, and their method of operation, however, it will be understood by those skilled in the art that different and numerous embodiments of the computer system, computer architectural structure, processor, register files, and their method of operation may be practiced without those specific details, and the claims and invention should not be limited to the system, assemblies, subassemblies, embodiments, features, processes, methods, aspects, and/or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising" specify the presence of stated features, integers, steps, operations, elements, and/or components, but do not preclude the presence or addition of one or more features, integers, steps, operations, elements, components, and/or groups thereof.

The following discussion omits or only briefly describes conventional features of information processing systems, including processors and microprocessor systems and architecture, which are apparent to those skilled in the art. It is assumed that those skilled in the art are familiar with the general architecture of processors, and in particular with processors which operate in an out-of-order execution fashion, including multi-slice processors and their use of registers. It may be noted that a numbered element is numbered according to the figure in which the element is introduced, and is typically referred to by that number throughout succeeding figures.

Figure 1:
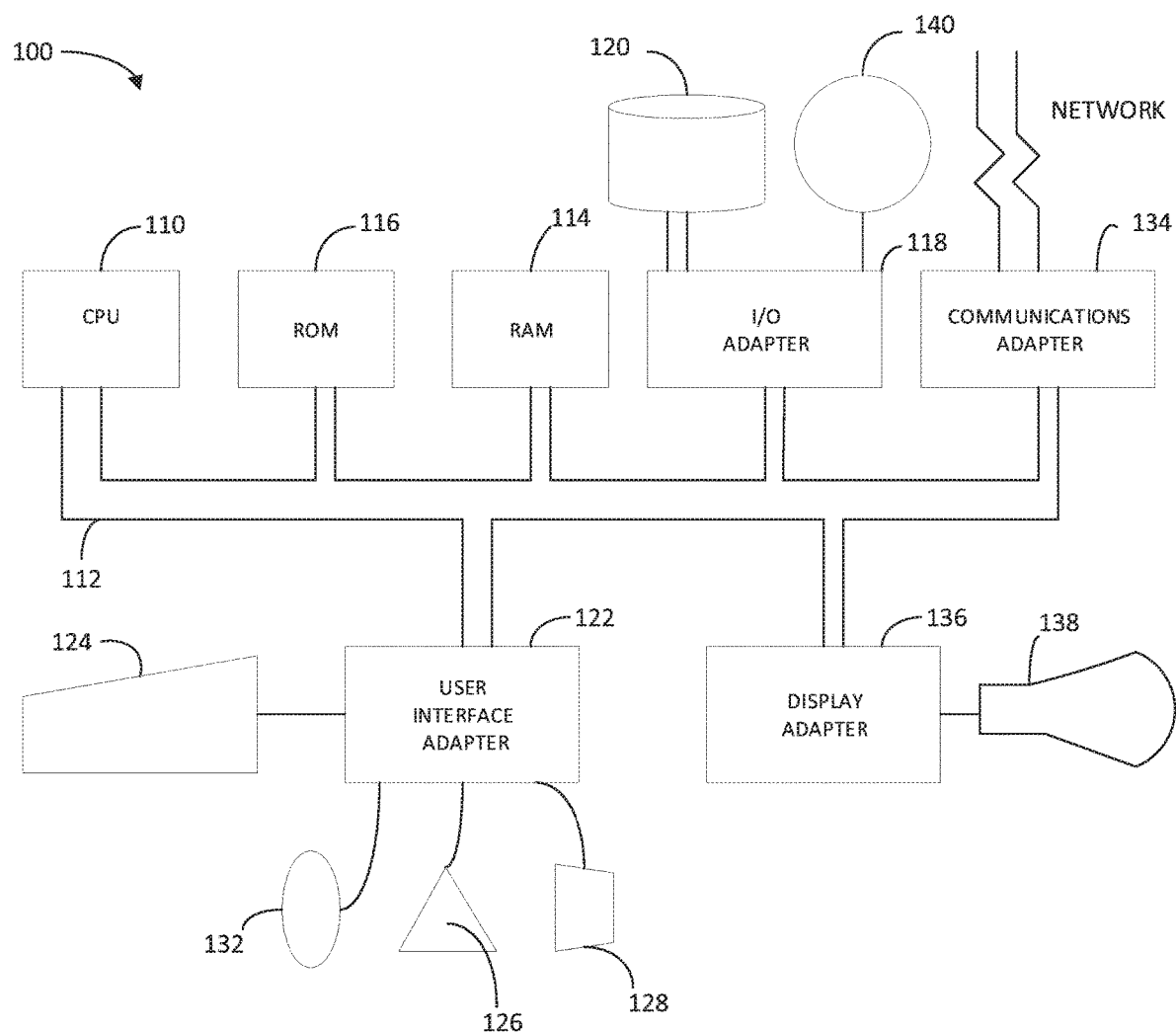
FIG. 1 illustrates an example of a data processing system in which aspects of the present disclosure may be practiced.

FIG. 1 illustrates an example of a data processing system 100 in which aspects of the present disclosure may be practiced. The system has a central processing unit (CPU) 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126, and speaker 128 are all interconnected to bus 112 via user interface adapter 122. Display monitor 138 is connected to system bus 112 by display adapter 136. In this manner, a user is capable of inputting to the system through the keyboard 124, trackball 132 or mouse 126 and receiving output from the system via speaker 128 and display 138. Additionally, an operating system such as, for example, AIX ("AIX" is a trademark of the IBM Corporation) is used to coordinate the functions of the various components shown in FIG. 1.

The CPU (or "processor") 110 includes various registers, buffers, memories, and other units formed by integrated circuitry, and may operate according to reduced instruction set computing ("RISC") techniques. The CPU 110 processes according to processor cycles, synchronized, in some aspects, to an internal clock (not shown).

Figure 2:
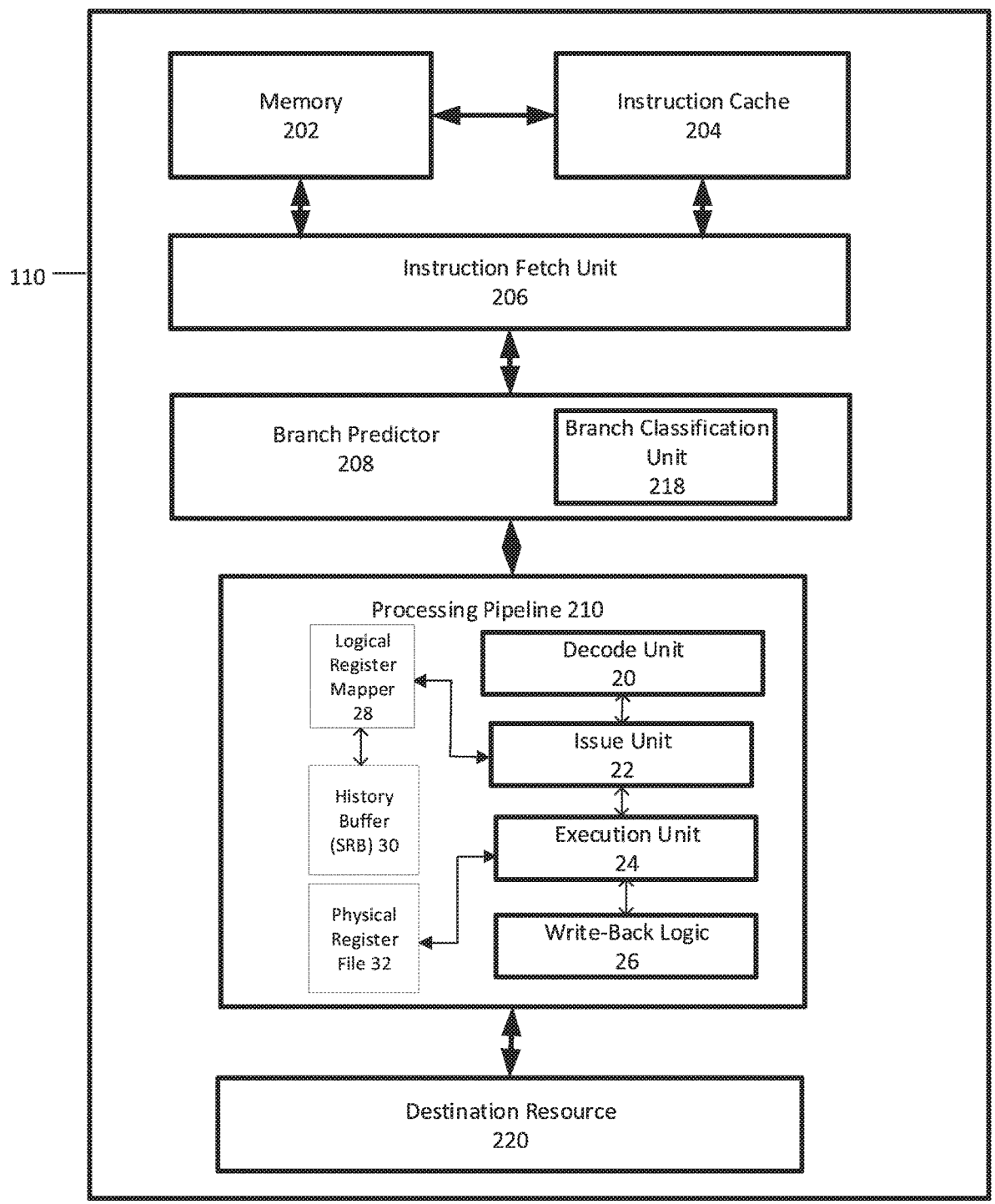
FIG. 2 illustrates a block diagram of a processor in which certain aspects of the present disclosure may be practiced.

FIG. 2 depicts a block diagram of a processor 110 according to an embodiment. The processor 110 includes memory 202, instruction cache 204, instruction fetch unit 206, branch predictor 208, branch classification unit 218, processing pipeline 210, and destination resource 220. The processor 110 may be included within a computer processor or otherwise distributed within a computer system. Instructions and data can be stored in memory 202, and the instruction cache 204 may access instructions in memory 202 and store the instructions to be fetched. The memory 202 may include any type of volatile or nonvolatile memory, such as cache memory. The memory 202 and instruction cache 204 can include multiple cache levels.

In FIG. 2, a simplified example of the instruction fetch unit 206 and the processing pipeline 210 are depicted. In various embodiments, the processor 110 may include multiple processing pipelines 210 and instruction fetch units 206. In an embodiment, the processing pipeline 210 includes a decode unit 20, an issue unit 22, an execution unit 24, write-back logic 26, a logical register mapper 28, a history buffer, e.g., Save & Restore Buffer (SRB) 30, and a physical register file 32. The instruction fetch unit 206 and/or the branch predictor 208 may also be part of the processing pipeline 210. The processing pipeline 210 may also include other features, such as error checking and handling logic, one or more parallel paths through the processing pipeline 210, and other features now or hereafter known in the art. While a forward path through the processor 110 is depicted in FIG. 2, other feedback and signaling paths may be included between elements of the processor 110. The processor 110 may include other circuits, functional units, and components.

The instruction fetch unit 206 fetches instructions from the instruction cache 204 according to an instruction address, for further processing by the decode unit 20. The decode unit 20 decodes instructions and passes the decoded instructions, portions of instructions, or other decoded data to the issue unit 22. The decode unit 20 may also detect branch instructions which were not predicted by branch predictor 208. The issue unit 22 analyzes the instructions or other data and transmits the decoded instructions, portions of instructions, or other data to one or more execution units 24 in the pipeline 210 based on the analysis. The physical register file 32 holds data for the execution units 24. The execution unit 24 performs and executes operations specified by the instructions issued to the execution unit 24. The execution unit 24 may include a plurality of execution units, such as fixed-point execution units, floating-point execution units, load/store execution units, vector scaler execution units, and/or other execution units. The logical register mapper 28 contains entries which provide a mapping between a logical register entry (LReg) and an entry in the physical register file 32. When an instruction wants to read a logical register entry (LReg), the logical register mapper 28 informs the issue unit 22, which informs the execution unit 24 where the data in the physical register file 32 can be located.

When a mispredicted branch instruction or other exception is detected, instructions and data subsequent to the mispredicted branch or exception are discarded, e.g., flushed from the various units of processor 110. A history buffer, e.g., Save & Restore Buffer (SRB) 30, contains both speculative and architected register states and backs up the logical register file data when a new instruction is dispatched. In this regard, the history buffer stores information from the logical register mapper 28 when a new instruction evicts data in case the new instruction is flushed and the old data needs to be recovered. The history (SRB) 30 buffer keeps the stored information until the new instruction completes. History buffer (SRB) 30 interfaces with the logical register mapper 28 in order to restore the contents of logical register entries from the history buffer (SRB) 30 to the logical register mapper 28, updating the pointers in the logical register mapper 28 so instructions know where to obtain the correct data, e.g., the processor is returned to the state that existed before the interruptible instruction, e.g., the branch instruction was mispredicted.

The write-back logic 26 writes results of executed instructions back to a destination resource 220. The destination resource 220 may be any type of resource, including registers, cache memory, other memory, I/O circuitry to communicate with other devices, other processing circuits, or any other type of destination for executed instructions or data. One or more of the processor pipeline units may also provide information regarding the execution of conditional branch instructions to the branch predictor 208.

Instructions may be processed in the processor 110 in a sequence of logical, pipelined stages. However, it should be understood that the functions of these stages may be merged together so that this particular division of stages should not be taken as a limitation, unless such a limitation is clearly indicated in the claims herein. Indeed, some of the stages are indicated as a single logic unit in FIG. 2 for the sake of simplicity of understanding, and further detail as relevant will be provided below.

Figure 3:
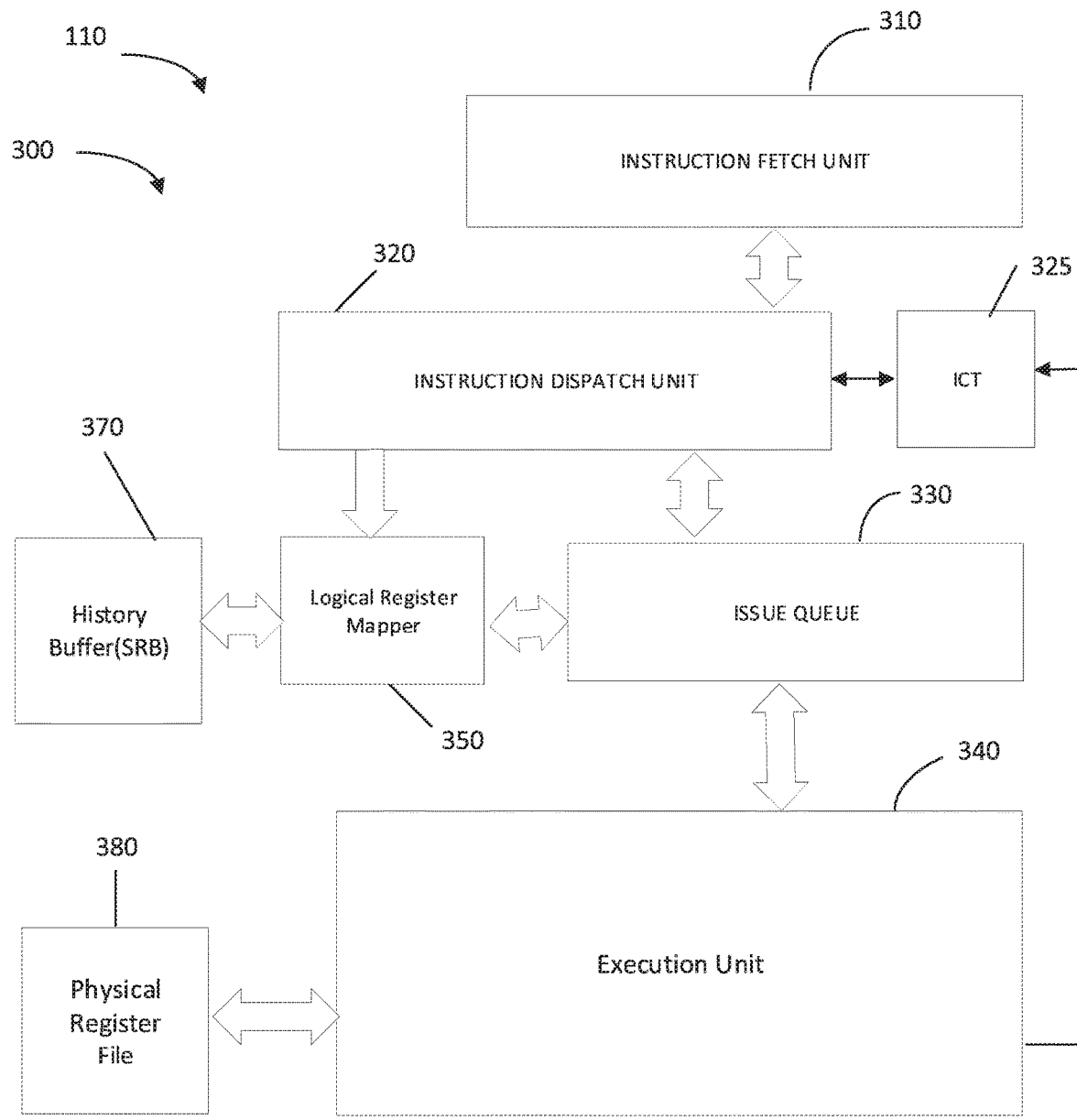
FIG. 3 illustrates a block diagram of a portion of a processor in accordance with an aspect of the present invention.

FIG. 3 illustrates a block diagram of a portion of a processor 110. The pipeline 300 in the processor 110 in FIG. 3 includes Instruction Fetch Unit 310, Instruction Dispatch Unit 320, Issue Queue (ISQ) 330, Instruction Completion Table (ICT) 325, Execution Unit 340, Logical Register Mapper 350, history buffer (SRB) 370, and Physical Register File 380. The Execution Unit 340 may include one or more queues to hold instructions for execution by the Execution Unit 340.

The Instruction Fetch Unit 310 fetches instructions to be executed by the processor 110 or processor slice and sends them to the Instruction Dispatch Unit 320. The Instruction Dispatch Unit 320 dispatches instructions to the Issue Queue (ISQ) 330, typically in program order. The Issue Queue (ISQ) 330 typically will issue instructions to the Execution Unit 340. The ISQ 330 typically holds an instruction until data associated with the instruction has been retrieved and ready for use. A physical register file 380 may serve to store data to be used in an operation specified in an instruction dispatched to an execution unit 340, and the result of the operation performed by the Execution Units 340 may be written to the designated target register entry in the physical register file 380. Typically in prior designs, different data types, such as, for example General Purpose Register (GPR) data (scalar data, 64 bits wide) and Vector/Scalar Register (VSR) dat (vector data, 128 bits wide) were kept separately in different registers.

When data is not ready, e.g., not within the appropriate data cache or register, delay can result as the ISQ 330 will not issue the instruction to the Execution Unit 340. For at least this reason, the Issue Queue (ISQ) typically issues instructions to the Execution Units 340 out-of-order so instructions where the required data is available can be executed. Dispatch Unit 320 will stamp each instruction dispatched to the Issue Queue 330 with an identifier, e.g., identification tag (itag), to identify the instruction. The Dispatch Unit 320 may stamp instructions with other information and meta data. The instructions (itags) typically are allocated (assigned) and stamped in ascending program order on a per thread basis by the Dispatch Unit 320. Dispatch Unit 320 may also maintain a per thread instruction counter that increments for each instruction in a thread that is dispatched to the Issue Queue 330.

The Execution Unit 340 executes instructions out-of-order and when the Execution Unit 340 finishes an instruction, the Execution Unit 340 will send the finished instruction, e.g., itag, to the ICT 325. The ICT 325 contains a queue of the instructions dispatched by the Dispatch Unit 320 and tracks the progress of the instructions as they are processed. In an embodiment, the ICT 325 has a completion tail pointer that keeps track of the progress of executing instructions in the thread, e.g., points to the next to complete instruction. The instruction entry in the ICT typically will not identify the instruction as complete until all older instructions in the thread are completed.

History buffer (SRB) 370 contains logical register entries the logical register mapper 350 evicted from the logical register mapper 350 by younger instructions. The information stored in the history buffer (SRB) 370 may include the itag of the instruction that evicted the logical register entry (i.e., the evictor itag) from the logical register. History buffer (SRB) 370, in an embodiment, stores itag, logical register entry number (the bit field that identifies the logical register entry (LReg)), and Register File tag (RFTag) information. The RFTag is a pointer that correlates an entry in a logical register to an entry in the Physical Register File 380. History buffer (SRB) 370 may store and track other information. Each slice of history buffer (SRB) 370 has an interface to the logical register mapper 350 to recover the itag, and register file tag (RFTag) (and other meta data) for each evicted logical register entry (LReg). The information is kept in the history buffer (SRB) 370 in a history buffer (SRB) entry until the new instruction (evictor instruction) is completed. At which point there is no reason to keep the old entry in the history buffer, e.g., SRB 370, and the entry is removed from the history buffer, as there is no flush recovery that could cause the history buffer (SRB) entry to be recovered Logical register mapper 350 contains meta data (e.g., itag, RFtag, etc.) which provides a mapping between entries in the logical register (e.g., GPR1) and entries in physical register file 380 (e.g., physical register array entry). The RFtag is the pointer that correlates a logical register entry to a physical register file entry. For example, when an instruction wants to read a logical register, e.g., GPR1, the logical register mapper 350 tells issue queue 330, which tells execution unit 340 where in the physical register file 380 it can find the data, e.g., the physical register array entry.

In certain aspects, a CPU 110 may have multiple execution/processing slices or pipelines with each slice having one or more of the units shown in FIG. 3. A CPU 110 having multiple processing slices may be capable of executing multiple instructions simultaneously, for example, one instruction in each processing slice simultaneously in one processing cycle. Such a CPU having multiple processing slices may be referred to as a multi-slice processor or a parallel-slice processor. Simultaneous processing in multiple slices may considerably increase processing speed of the multi-slice processor. In single-thread (ST) mode a single thread is processed, and in SMT mode, two threads (SMT2) or four threads (SMT4) are simultaneously processed.

Figure 4:
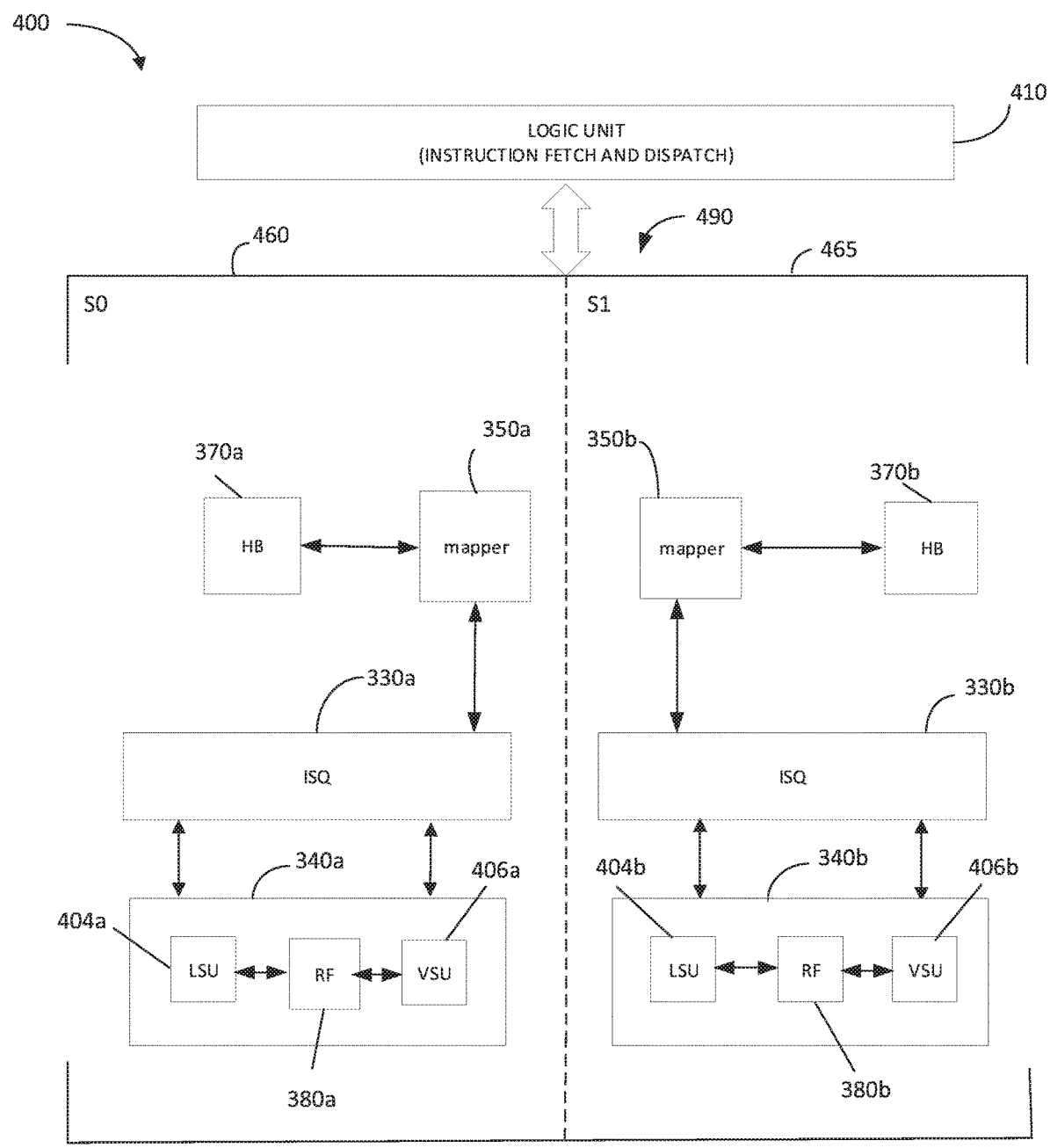
FIG. 4 illustrates a multi-slice processor in accordance with certain aspects of the present disclosure.

FIG. 4 illustrates a diagram of a multi-slice processor 400 in accordance with an embodiment of the present disclosure. It may be noted that FIG. 4 only shows portions of the multi-slice processor 400 in diagrammatic fashion for purpose of discussion. It will be appreciated that the multi-slice processor may have other configurations. As shown in FIG. 4, the multi-slice processor 400 includes two processing slices-Slice 0 (slice S0 or 460) and Slice 1 (slice S1 or 465). Each of the slices S0 and S1 includes an issue queue (ISQ) (330*a* and 330*b*), execution units (340*a* and 340*b*) including a load store unit (LSU) (404*a* and 404*b*), a vector scalar unit (VSU) (406*a* and 406*b*), a register file (RF) (380*a* and 380*b*), a history buffer (HB) (370*a* and 370*b*), and a mapper (350*a* and 350*b*).

It may be noted that two slices are shown for ease of illustration and discussion only, and that multi-slice processor 400 may include more than two processing or execution slices with each slice having the components discussed above for each of the slices S0 and S1 (slices 460 and 465). Further, the processing slices may be grouped into super slices (SS 490), with each super slice including a pair of processing slices. For example, a multi-slice processor may include two super slices SS0 and SS1, with SS0 including slices S0 and S1, and SS1 including slices S2 and S3. In an aspect, one register file may be allocated per super slice and shared by the processing slices of the super slice. In another aspect, one register file may be allocated to more than one super slice and shared by the processing slices of the super slices. For example, slices S0, S1, S2, and S3 may be allocated to share one register file. In another aspect, each execution/processing slice may have its own register file.

As shown, logic unit 410 may perform instruction fetch and dispatch for the multi-slice processor. In certain aspects, the ISQ holds a set of instructions and the register file accumulates data for the instruction inputs. A register may be used for staging data between memory and other functional units in the processor. There may be numerous register files and types. When all source data accumulates for the instruction, the data is passed on to one or more execution units designated for execution of the instruction. Each of the LSUs 404 and VSUs 406 may make result data available on the write back buses for writing into a register file (RF) entry. The register files will be discussed in more detail below.

In previous register architectures, different data types having different bit widths were kept separately in different register files. That is, scalar data that was sixty-four (64) bits wide, e.g., GPR data, was kept in a separate register file than vector data that was 128 bits wide, e.g., VSR data. This type of data structure is inefficient and difficult to scale. If the code is mostly 64-bit data type, then the 128-bit register file type sits idle. If the code is mainly 128-bit data type, then the 64-bit register file type sits idle.

The disclosure is directed to processors, e.g., microprocessors, and, in particular, register files associated with processors. Register files are typically used in association with execution units, such as, for example, VSUs, LSUs, FXUs, SFXUs, etc. The register files store data, e.g., operands, for use by the execution units for executing instructions. In operation, data may be read from the register file, e.g., a register file entry or location, and the result, for example, will be written back to the register file, usually to a different register file location or entry. In a processor, many execution units may work in parallel which makes handling of data read from and written to the register files complex.

The disclosure is directed to a register file structure to store both scalar (e.g., 64-bit wide) data and vector (e.g., 128-bit wide) data in one structure. Depending upon the instruction being executed, an entry in the register file can be allocated to the 64-bit scalar instruction or the 128-bit vector instruction. More specifically a method, system, and/or architecture for dynamically allocating a register file is disclosed that allocates one full register file entry to one 128-bit vector instruction, or half a register file entry to a 64-bit scalar instruction. In an embodiment, the location of the data in the register file entry will depend upon whether the instruction is running in single threaded mode or SMT mode. In single thread mode, a vector instruction will use one full 128-bit register file entry, while a scalar instruction will use half of the register file entry, i.e., use only 64-bits, and the other half of the entry is left unused. In simultaneous multi-threading mode (SMT), a vector instruction will use one full 128-bit register file entry, and a scalar instruction will use half of the register file entry where both halves of the register file entry can be used for two (2) scalar instructions. Each half of a register file entry in SMT mode can be updated by a scalar of a thread. In an embodiment, a scalar from one thread, e.g., thread 0, will use the left-half of the register file entry, and a scalar from the other thread, e.g., thread 1, will use the right half of the register file entry. That is, two threads of scalar data can share the same register file entry.

The mapper allocates one register file entry for a vector instruction and half a register entry for a scalar instruction. In single thread mode, one half of the register file entry is allocated to an instruction, and the mapper can not allocate the other half of the register file entry to another instruction. In SMT2 mode (double threaded mode), both halves of a register file entry can be allocated to two different scalar instructions, one thread will be allocated to the left half of a register file entry, and the other thread will be allocated to the right half of the register file entry. When the register is read for an operand by an instruction, a vector instruction will read all 128-bits from a register file entry for its operand while a scalar instruction will read 64-bits from half the register file entry (from its own thread) for its operand. When the register file is written back by an instruction, a vector instruction will write all 128-bits to a register file entry while a scalar instruction will write 64-bits to half of a register file entry, and particularly to its own thread's half, e.g., thread 0 to the left half and thread 1 to the right half.

FIGS. 5A and 5B show a simplified diagram of register file 510. Register file 510 is used for two processing or execution slices S0 and S1 (a super slice SS0) of the processor core. Register file 510 has a plurality of entries 511, and in one example has 360 entries. Register file 510 can have more or less entries depending upon the design. Each entry 511 in the register file 510 is 128 bits wide. Each entry in the register file 510 can be split into two 64-bit halves as shown in FIGS. 5A and 5B. Register file 510 in FIG. 5A has scalar and vector data allocated for single-thread mode, while register file 510 in FIG. 5B has scalar and vector data allocated in SMT2 mode (double-thread mode). As shown in FIG. 5A, register file entries 0-3 show scalar 64-bit data, e.g., GPR and FPR data, in the left half of the register file entries 511, and vector 128-bit data in entry 4. The right half of entries 0-3 in FIG. 5A remain unused in single thread mode as the mapper will not allocate entries to the second half of the register file entry. As shown in FIG. 5B, register file entries 0-3 show scalar 64-bit data, e.g., GPR and FPR data, in the left and right halves of the register file entries, and vector 128-bit data in entry 4. The right half of scalar data entries can have different types of scalar data than the left half of scalar data entries, as shown in entries 1 and 3.

In one or more embodiments, the register file is sliced into smaller banks or sub-blocks. The total number of register file entries in a register file sliced or partitioned into a plurality of banks remain the same. For example, the register file 510 in FIGS. 5A and 5B for super slice SS0 has 360 register entries, and in the example of FIG. 6, the STF register file 610 for super slice SS0 has 360 register entries that have been sliced or partitioned into four banks or sub-blocks, Bank 0 (B0), Bank 1 (B1), bank 2 (B2), and bank 3 (B3). Each execution unit in an execution slice is assigned to write to only one bank or sub-block of the register file. This is referred to as a slice-target register file (STF). While four banks are shown in FIG. 6, it will be appreciated that each register file may be sliced or partitioned into more or less banks. Each bank in FIG. 6 has ninety (90) entries, however, they may have more or less entries and unequal amounts of entries.

Figure 7:
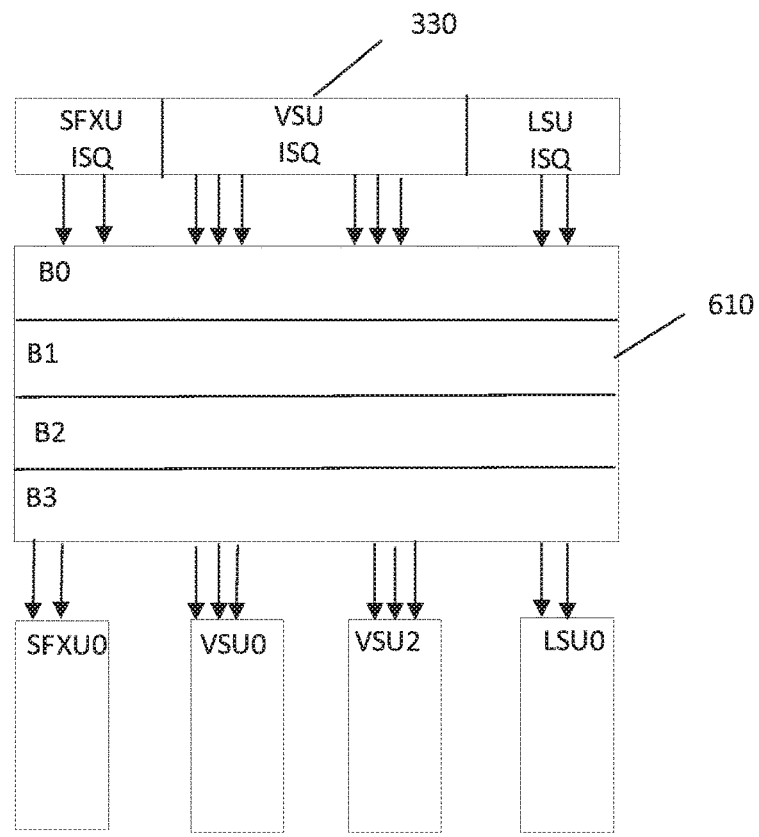
FIG. 7 is a block diagram illustrating an issue queue, register file, and execution units in an embodiment of a processor according to the present disclosure.

Register file 510, 610 has one or more write back ports and one or more read ports. In an embodiment, the read ports in the register file 510, 610 are associated with, e.g., connected to, four execution units, e.g., two (2) vector scalar units (VSU), one load store unit (LSU), and one simple fixed unit (SFXU) as shown in FIG. 7. Two vector scalar units (VSUs), one load store unit (LSUs) and one fixed-point unit (FXU), for example, may be utilized for each super slice of a processor. Other execution or functional units may be used in addition to or alternatively to the VSU, SFXU and/or the LSU.

Figure 8:
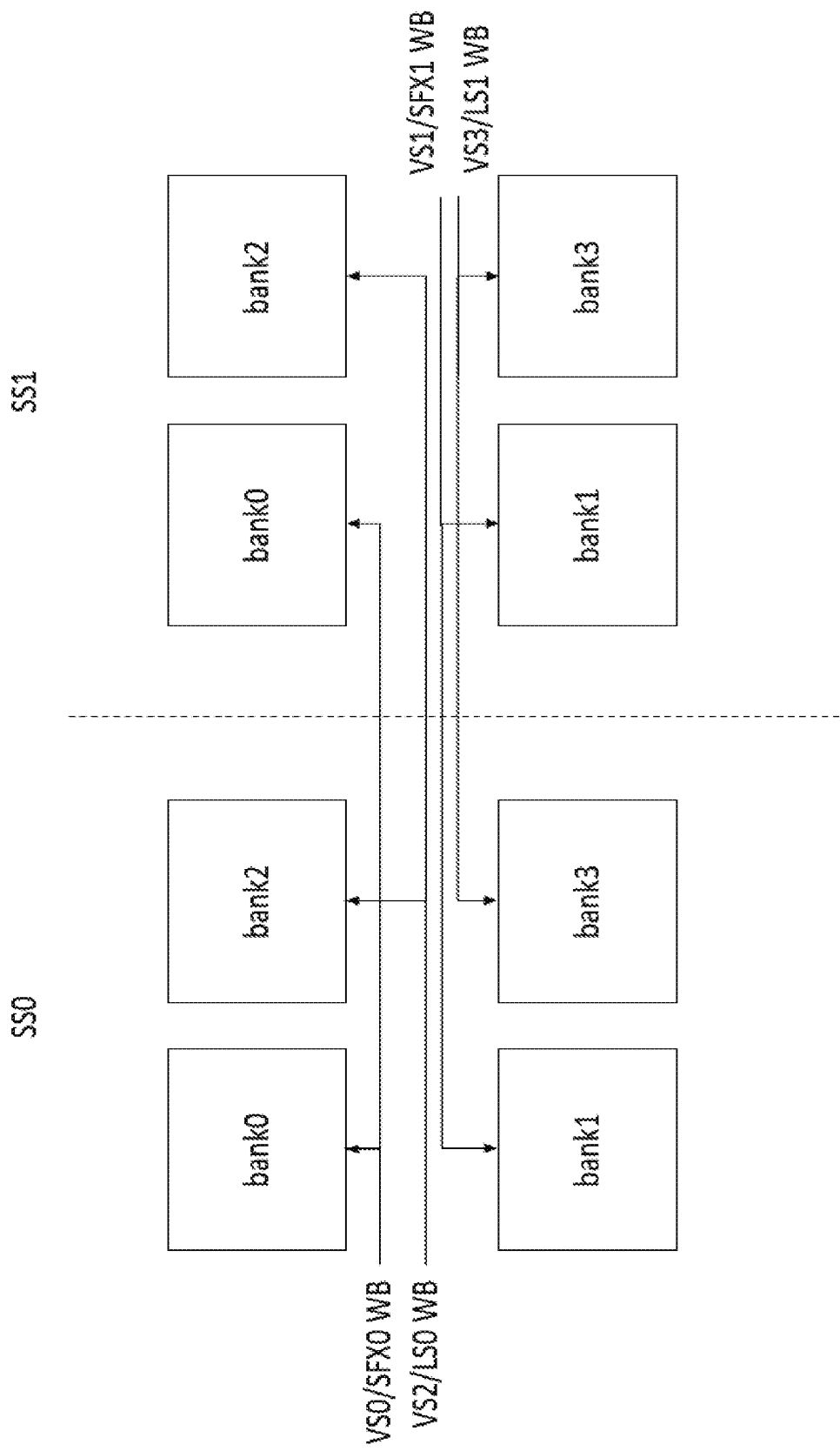
FIG. 8 illustrates a diagram of STF banks or sub-blocks of a register file with their execution write back lines in the respective super slices of a processor in accordance with an aspect of the present disclosure.

FIG. 8 illustrates a slice target register file with two STF registers, one STF register per super slice, where each STF register 610 has four banks—bank 0 (B0), bank 1 (B1), bank 1 (B2), and bank 3 (B3). FIG. 8 illustrates for each super slice SS0 and SS1 which execution units targets, e.g., writes, to which bank of the register file. Assigning each execution unit in an execution slice a bank or sub-block of a register file has scalability. For example, in an embodiment, for each execution unit added to an execution slice, another bank or sub-block of slice-target register file (STF) can be added to the register file without significantly increasing the overhead (area used) on the processor chip. If the register file is sliced into banks as shown in FIGS. 6, 7, and 8, each execution unit in an embodiment writes data to only one specific bank of each super slice, but in one or more embodiments each execution unit can read data from any bank.

The slice target register file (STF) holds the data for executing instructions. STF tags are addresses identifying the different entries (locations) in the slice-target register file (STF). STF tags are allocated to dispatching instructions at dispatch time and deallocated at instruction flush or completion. The physical STF array where the data is held is located in the VSU. The STF mapper is responsible for providing STF tags for instruction sources and destinations which will be used as read and write addresses for the physical STF.

Each STF bank or sub-bank has a plurality of 128-bit entries, e.g., ninety (90) 128-bit entries. These STF entries can be addressed in sixty-four (64) bit sizes which effectively doubles this number of entries, e.g., 180 64-bit entries. The STF tag is ten bits where the upper two bits identify the bank or sub-block, and eight bits identify the address (entry No., location) in the sub-block or bank. The bit field of the STF tag in an embodiment is set-up and encoded as in Table 1.

TABLE 1

| Bits | Description |
|---|---|
| | STF Tag Bit Field |
| 0:1 | Sub-block/bank identification<br>00: sub-block 0<br>01: sub-block 1<br>10: sub-block 2<br>11: sub-block 3 |

TABLE 1-continued

| Bits | Description |
|---|---|
| | STF Tag Bit Field |
| 2:8 | Entry index (entry No. or location) into the sub-block |
| 9 | Left/right select, selects left or right 64 bit half of STF entry |

Each STF entry is 128-bits wide and can hold either a single 128-bit register (VSR) or two 64-bit registers (GPR/FPR/CNT/LNK/TAR) as shown in Table 2 where x and y indicate different threads.

TABLE 2

| STF Entry | Left (0:63) | Right (0:63) |
|---|---|---|
| | STF Entry Bit Field | |
| a | GPRx (0:63) | GPRy (0:63) |
| b | VSRy (64:127) | VSRy (0:63) |
| c | VSRx (0:63) | VSRx (64:127) |

The threads in each superslice have a different data layout for 128-bit data stored in the STF entry. As shown in Tables 2 and 3, thread y has VSR data arranged so bit field (64:27) is in the left half of the STF entry while bit field (0:63) is in the right half of the STF entry. Thread x on the other hand has bit field (0:63) in the left half STF entry while bit field (64:127) is in the right half entry. Having a different data layout for the different threads helps support data flow when a VSR is being used as a 64-bit register (FPR). An example of the different 128-bit data layout in the STF register for the different threads is shown in table 3.

TABLE 3

| Thread | Left (0:63) | Right (0:63) |
|---|---|---|
| | 128 Bit STF Entry Layout | |
| Thread x | VSR (0:63) | VSR (64:127) |
| Thread y | VSR (64:127) | VSR (0:63) |

128-bit data uses both halves of the STF entry regardless of the thread that is running, but sixty-four (64) bit data uses the left half or right half of the STF sub-block or bank depending upon which thread is associated with the instruction as shown in Table 4 below. In single thread mode, only the left half of the STF entry is used for 64-bit registers.

TABLE 4

| | | SS0 | | SS1 | |
|---|---|---|---|---|---|
| | | 64-Bit STF Entry Layout | | | |
| Mode | Left (0:63) | Right (0:63) | Left (0:63) | Right (0:63) |
| ST | Thread 0 (thr x) | — | Thread 0 (thr x) | — |
| SMT2 | Thread 0 (thr x) | Thread 2 (thr y) | Thread 0 (thr x) | Thread 2 (thr y) |
| SMT4 | Thread 0 (thr x) | Thread 2 (thr y) | Thread 1 (thr x) | Thread 3 (thr y) |

Each 64-bit half of an STF entry has its own free bit which identifies when an STF entry half is free and available to receive data. Each half of the STF entry having its own free bit permits the two halves to be allocated and deallocated independently when not being used for 128-bit VSRs. The STF Mapper is responsible for maintaining the STF tag Free List. The tag Free List is used to allocate and deallocate STF tags. Each bank or sub-block will be managed by and has its own independent Free List. Each sub-block or bank can allocate up to four STF tags (four 128-bit or four 64-bit entries) per cycle. In the example where there are four banks this would be sixteen (16) STF entries can be allocated to receive an instruction per cycle. Allocating up to four STF tags/entries per cycle, per bank simplifies dispatch logic by allowing the dispatch of any combination of instruction destinations. To maximize the ability to dispatch any combination of destinations, each sub-block or bank is searched for four (4) left 64-bit entries that are free, four (4) right 64-bit entries that are free, and four (4) 128-bit entries that are free. Table 5 below shows the maximum number of allocations per sub-block, e.g., four, which the mapper can support where in the extreme case the dispatching instructions are of the same execution type in ST/SMT2 mode.

TABLE 5

Bank Allocations

| SS0 | | | | SS1 | | | | Block 0 Allo. | Block 1 Allo. | Block 2 Allo. | Block 3 Allo. |
|---|---|---|---|---|---|---|---|---|---|---|---|
| i0 | i1 | i2 | i3 | i4 | i5 | i6 | i7 | | | | |
| VS0 | VS0 | VS0 | VS0 | VS1 | VS1 | VS1 | VS1 | 4 | 0 | 4 | 0 |
| VS2 | VS2 | VS2 | VS2 | VS3 | VS3 | VS3 | VS3 | 0 | 4 | 0 | 4 |
| LS0 | LS0 | LS0 | LS0 | LS1 | LS1 | LS1 | LS1 | 0 | 4 | 4 | 0 |
| SFX0 | SFX0 | SFX0 | SFX0 | SFX1 | SFX1 | SFX1 | SFX1 | 4 | 0 | 0 | 4 |

In one or more embodiments, each free bit is a vector of two (2) bits that are used to support 0-cycle moves to and/or from an STF entry. Each STF tag can be used by up to two instructions (as part of the 0-cycle move to and/or from feature) and therefore needs two bits to track the two possible allocations and/or deallocations. As there are four banks in the register file in the examples of FIGS. 6, 7, and 8, there would four Free Lists, one per bank. In an embodiment, there is one mapper/free list per super slice and in ST mode or SMT2 mode, both mappers/freelists are in sync, which means they are logically identical. In an embodiment, in SMT4 mode, each mapper/freelist, one per super slice, is independent of the other.

Figure 9:
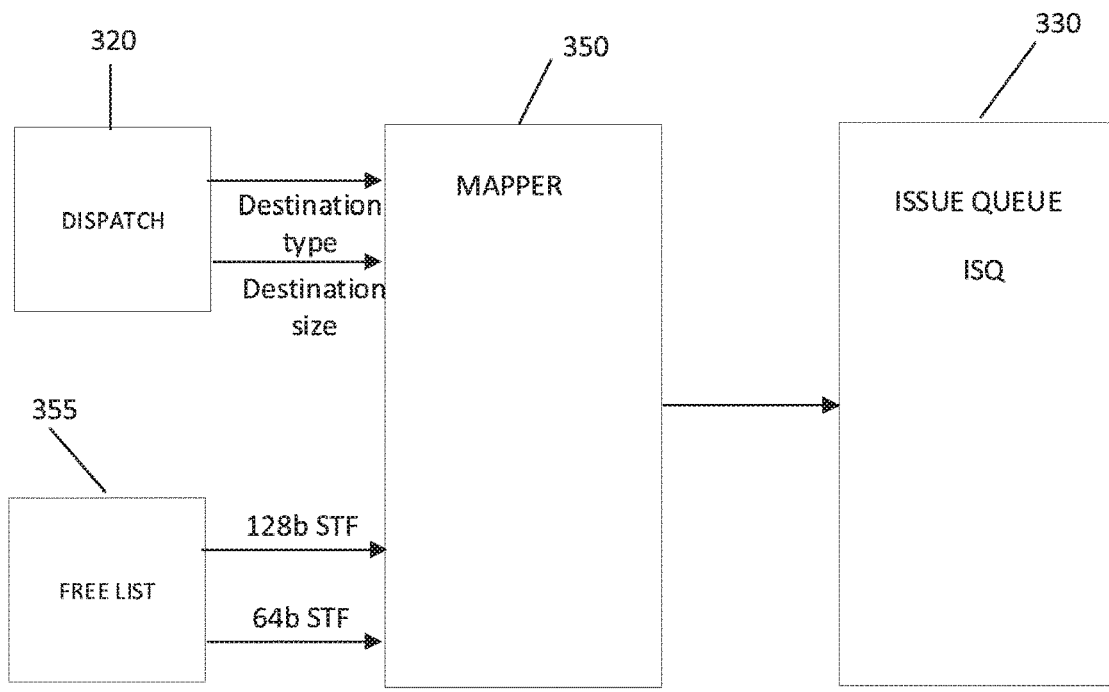
FIG. 9 is a block diagram illustrating a dispatch unit, free list, mapper, and issue queue in an embodiment of a processor according to the present disclosure.

FIG. 9 illustrates a block diagram of a Dispatch Unit 320, Mapper 350, Free List 355 and Issue Queue 330 in a processor. Dispatch 320 can issue up to eight (8) instructions per cycle. The Free List 355 allocates up to eight (8) STF tags (128 bits or 64 bits) per cycle to support the eight (8) dispatching instructions. Each sub-block or bank of the register file can allocate up to a maximum of four (4) STF tags per cycle. In this context, an STF tag is defined as either a single 128 bit STF tag or a single 64 bit STF tag. The mapper 350 achieves this by doing two searches in parallel, one searching for available 128-bit STF tags, i.e., STF tags where both left and right 64-bit halves are free, and another search looking for available 64 bit tags, i.e., STF tags where either the left or right 64-bit halves are free. The located free STF tags are latched and assigned to dispatching instructions. As shown in FIG. 9, destination indictors, e.g., destination type (VSU/LSU), destination size (128 bit or 64 bit), and destination valid, travel from the Dispatch Unit 320 and are latched in the Mapper 350 where the STF tags are read from the Free List 355, assigned to the instruction destination, and sent to the Issue Queue 330. Depending upon the instruction type and the number of dispatching instructions, any instruction could be assigned any of the thirty-two (32) available STF tags (4 banks X (4 128b tags and 4 64b tags)) per bank from the Free List 355.

More specifically, in an embodiment, dispatch 320 will receive a total of twelve hole counts from the mapper 350, including three hole counts for each of the four sub-blocks or banks. Each sub-block or bank contributes one hole for a thread X 64-bit (left half), one hole for a thread Y 64-bit (right half), and one hole for a thread XY 128 bit. The hole count sent to dispatch 320 from the Mapper 350 will be based upon a count of the available entries per sub-block/bank on the Free List 355. The 64 bit counts will be per thread where thread X accounts for the left half of the STF entry and thread Y accounts for the right half of the STF entry. The 64 bit counts will only count those entries that are not eligible to be used for 128 bit instructions, e.g., where only one half of the 128 bit STF entry is free. The 128 bit hole count will only count those entries that have both left and right halves free. Dispatch 320 will use these hole counts to determine the number of instructions of each type that it can send. If dispatch 320 needs to send a 64-bit instruction it will first use a 64 bit hole count to allocate an STF tag, but if the 64 bit hole count is zero for the relevant thread, then dispatch can allocate from the 128-bit hole count and use a 128-bit STF entry. Using a 128-bit entry is less efficient, but it gives dispatch 320 the flexibility to avoid stalls.

The Free List count is sent to dispatch 320 via the hole count to inform dispatch how many STF tags are available. This provides dispatch 320 with the correct number of available STF tags relative to the number of instructions to dispatch. It is important to update the hole count to dispatch 320 as quickly as possible since if there are no STF tags available or a limited number of STF tags available, then dispatch may stall instructions or dispatch instructions with limited bandwidth. The faster STF tags can be reused, the shorter the potential window and likelihood of dispatch stalls.

STF tags are freed up or deallocated by the history buffer (SRB) after a flush or instruction completion. The same pipeline is used for both a flush or completion process, and the STF tag becomes visible (available) in the Free List 355 in the next cycle. In order to reduce this pipeline and make the STF tags available sooner, a bypass is added that updates the hole count sooner. This is accomplished by updating the hole count based upon the number of entries that will be added to the Free List of each bank and skipping the cycle of waiting for the free entries to be written to the Free Lists, latched, and then read to update the hole count. This bypass also allows freed STF tags to be used sooner without having to wait for them to propagate through the Free Lists. The history buffer, e.g., SRB, also sends a hole count to dispatch accounting for the STF tags it will free up for an even faster hole count update.

Figure 10:
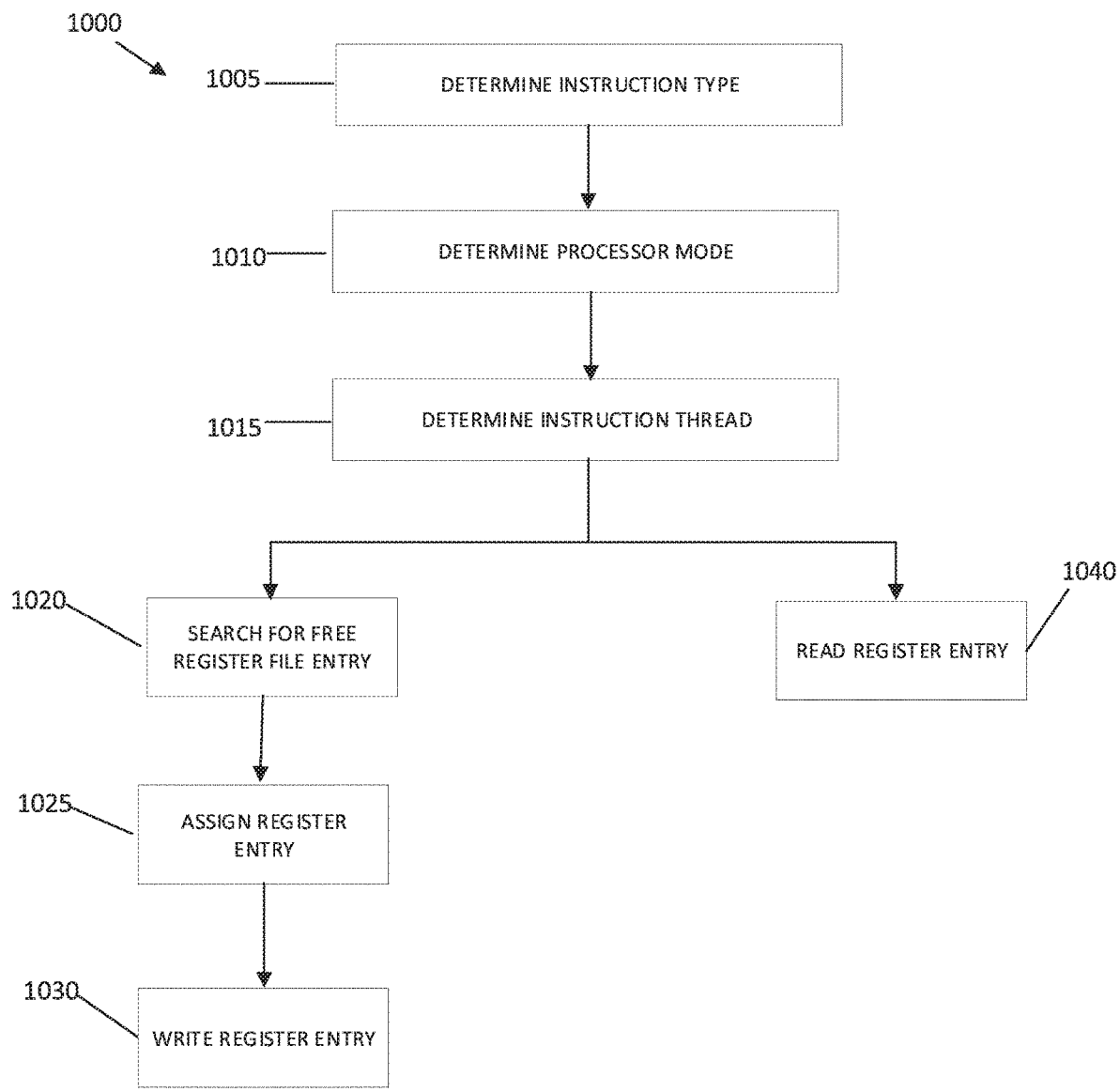
FIG. 10 is a block diagram of an issue queue, register file, and execution units. flow diagram of a method according to an embodiment for processing data in a processor.

FIG. 10 is an exemplary flowchart in accordance with one embodiment illustrating and describing a method of handling data in a register file, including a slice target register file (STF), in accordance with an embodiment of the present disclosure. While the method 1000 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 10, but the process may be integrated and/or one or more steps may be performed together, simultaneously, or the steps may be performed in the order disclosed or in an alternate order.

In the method 1000 of handling data in a processor, including more specifically handling data in a register file, more specifically storing (writing) data to and reading data from the register file. In one or more embodiments, the register file is structured to store both scalar and vector data types, e.g., different register types, in one structure. In one or more aspects, an entry in the register file can be allocated to two scalar instructions or one vector instruction, and which register file entry half is used is dependent on whether the processor is running in single thread mode, or in SMT mode, more specifically SMT2 or SMT4 mode. In one or more embodiments, the register file is a slice target register file (STF), where in an aspect each execution unit targets a specific slice, bank, partition, or sub-block of the register file to write data. In an embodiment, the scalar data is 64 bits and the vector data is 128 bits.

At 1005 the instructor type is determined. That is, the processor determines whether the instruction type is a scalar instruction or a vector instruction. While the register file structure preferably handles both scalar register data and vector register data, the data will be handled differently depending on the data/instruction type.

At 1010, it is determined whether the processor is operating in single thread mode or in SMT mode, and if in SMT mode, whether in SMT2 (2-threads) or SMT4 (4-thread) mode. The register file in one or more instances will handle the register data differently depending upon the processor mode of operation. At 1015, it is determined what thread is being executed. The register file in one or more aspects will handle the data differently depending upon the thread of execution.

At 1020, when writing data to a register file, the processor, preferably, the mapper searches for register file entries that are free (not allocated). In one or more embodiments, two searches are performed, one search for entries where both left and right halves of register file entries are free, and another search for where either a left or right half of a register file entry is free. In an embodiment, where the register file is sliced into multiple banks, each bank may be independently searched for one or more free register file entries, where in an aspect, either a single whole register file entry or a single half register file entry is considered as one free register file entry. In one or more aspects, more free register file entries are searched then there are instructions that are dispatched per cycle. In one or more embodiments, the Mapper manages a Free List that is used to allocate and deallocate STF tags, e.g., STF register file entries, and in an aspect, each bank has its own Free List, and each bank can allocate one or more STF tags.

At 1025, an STF entry is assigned to a dispatched instruction. In one or more embodiments, an instruction at 1030 writes to a register file entry. In an embodiment, a vector instruction writes all bits to a single register file entry where, in an embodiment, a first thread writes bit field (0:63) in the left half and bit field (64:127) in the right half of a register file entry, and a second thread writes bit field (0:63) in the right half and bit field (64:127) in the left half of a register file entry. In one or more embodiments, scalar data is written to half a register file entry, and for scalar data, in single thread mode, the data is written to the left half and the right half of the register file entry is left empty. For scalar data in SMT2 mode, one thread will write to the left half and the other thread writes to the right half, where the register file entry can be allocated to and receives data from two different scalar instructions. For scalar data in SMT4 mode, each thread writes to half of a register file entry, and in an embodiment two register file entries across two super slices is required to write the data from the four threads, and in an aspect, even threads are written to one register file entry and odd threads are written to a different register file entry on a different super slice.

Method 1000 of handling data continues at 1040 where reading a register file operation is undertaken. In one or more embodiments, a vector instruction is processed and associated vector data is read from a whole register entry, and in an embodiment from a whole STF register entry. In an aspect, depending upon the thread, the vector instruction will read both halves and all bits for its operand, but different bit fields will be in different halves of the register file entry. In one or more embodiments, a scalar instruction is processed and associated scalar data is read from half of the register file entry according to the thread.

Disclosed is a method to dynamically allocate half a register file entry to a scalar instruction or allocate a whole register file entry to a vector instruction, and in an aspect the specific location of the data bit field in the register entry depends upon whether the processor is running in single threaded mode or simultaneous multi-threading (SMT) mode.

While the illustrative embodiments described above are preferably implemented in hardware, such as in units and circuitry of a processor, various aspects of the illustrative embodiments may be implemented in software as well. For example, it will be understood that each block of the flowchart illustration in FIG. 10, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer system for processing information, the computer system comprising:
    at least one computer processor;
    a register file associated with the at least one computer processor, the register file having a plurality of entries for storing data where each register file entry has two halves, the register file having multiple ports to write data to the register file and multiple ports to read data from the register file; and
    one or more execution units associated with the register file, the execution units configured to read data from the register file and to write data to the register file,
    wherein the at least one computer processor is configured to write either scalar data or vector data to a single register file entry; and each half of the single register file entry has a free bit to identify when each respective half of the single register file entry is free and available to be allocated to receive data.

2. The computer system according to claim 1, wherein the register file spans across a super slice of execution units.

3. The computer system according to claim 1, wherein an execution unit writes vector data to each half of the single register file entry in both single thread mode and double thread mode.

4. The computer system according to claim 3, wherein the vector data written to each half of the single register file entry depends upon a thread that is being executed.

5. The computer system according to claim 1, wherein the at least one computer processor is further configured to write scalar data to one of the two halves of the single register file entry.

6. The computer system according to claim 5, wherein the at least one computer processor in single thread mode is configured to write scalar data into one of the two halves of the single register file entry and to leave the other one of the two halves of the single register file entry empty.

7. The computer system according to claim 5, wherein in double thread mode the at least one computer processor is configured to write a first thread of scalar data into a first half of a first single register file entry and write a second thread of scalar data into a second half of the first single register file entry.

8. The computer system according to claim 5, wherein the one of the two halves of the single register file entry into which scalar data is written and read is dependent upon a thread of instructions.

9. The computer system according to claim 1, further comprising a mapper that tracks and manages the register file entries, the mapper having a free list that identifies which halves of a register file entry are free to receive data.

10. The computer system according to claim 9, wherein the mapper performs two searches, a first search to identify register file entries that have a single half entry that is free and a second search to identify register file entries that have both of the two halves of a whole register file entry free.

11. The computer system of claim 1, wherein the register file is partitioned into a plurality of banks, and each execution unit writes to a specified bank.

12. The computer system of claim 11, wherein a mapper provides slice target register file (STF) tags which identify the different register file entries where the STF tags comprise a bit field that include one or more bits for identifying the specified bank of the register file, and one or more bits for identifying a location of the single register file entry in the specified bank.

13. The computer system of claim 12, wherein the STF bit field includes one or more bits to select between the two halves of the single register file entry.

14. The computer system of claim 12, wherein the mapper allocates one STF tag for half the single register file entry, and one STF tag for the two halves of the single register file entry.

15. The computer system of claim 12, wherein each bank of the register file can allocate up to X STF tags per cycle where each bank is searched for X left half register file entries that are free, X right half entries that are free, and X whole register file entries that are free, where X is an integer greater than one.

16. The computer system of claim 1, wherein vector data is read from the two halves of a single register file entry according to a thread, and scalar data is read from one of the two halves of a single register file entry according to a thread.

17. A computer system for processing information, the computer system comprising:
- at least one processor; and
- a register file associated with the at least one processor, the register file having a plurality of entries for storing data, one or more of the register file entries having two halves, each half of the one or more register file entries having a free bit to identify when a respective half of a register file entry is free and available to be allocated to receive the data, the register file having multiple ports to write data to the register file and multiple ports to read data from the register file;
- one or more execution units associated with the register file, the one or more execution units configured to write data to and read data from the register file;
- one or more computer readable non-transitory storage media; and
- programming instructions stored on the one or more computer readable non-transitory storage media for execution by the at least one processor, the programming instructions comprising:
  - programming instructions to read either scalar or vector data from at least one of the plurality of register file entries in the register file; and
  - programming instructions to write, in response to the free bit of each half of the one or more register file entries, either scalar or vector data to at least one of the one or more register file entries in the register file.

18. A method of processing data in a system having a processor, the method comprising:
- providing a register file having a plurality of register file entries, one or more of the register file entries having two halves, each half of the one or more of the register file entries having a free bit to identify when a respective half of a register file entry is free and available to be allocated to receive data;
- writing vector data to the two halves of the one or more register file entries in response to the free bit of the two halves of the one or more register file entries indicating that the two halves of the one or more register file entries are free; and
- writing scalar data to one of the two halves of the one or more register file entries in response to the free bit of the one of the two halves of the one or more register file entries indicating that the one of the two halves of the one or more register file entries are free.

19. The method according to claim 18, further comprising writing scalar data from two different threads of execution wherein the scalar data from a first thread of execution is written to a first half of the one or more of the register file entries, and the scalar data from a second thread of execution is written to a second half of the one or more of the register file entries.

* * * * *